(12) United States Patent
Nishizawa et al.

(10) Patent No.: US 11,125,295 B2
(45) Date of Patent: Sep. 21, 2021

(54) DAMPING DEVICE

(71) Applicant: NHK International Corporation, Novi, MI (US)

(72) Inventors: Shinichi Nishizawa, Walled Lake, MI (US); Vinay Ravi, Royal Oak, MI (US); Norifumi Momoi, Northville, MI (US)

(73) Assignee: NHK INTERNATIONAL CORPORATION, Novi, MI (US)

( * ) Notice: Subject to any disclaimer, the term of this patent is extended or adjusted under 35 U.S.C. 154(b) by 95 days.

(21) Appl. No.: 16/557,250

(22) Filed: Aug. 30, 2019

(65) Prior Publication Data

US 2021/0062885 A1 Mar. 4, 2021

(51) Int. Cl.
| | |
|---|---|
| *F16F 7/10* | (2006.01) |
| *F16F 7/104* | (2006.01) |
| *F16F 1/06* | (2006.01) |
| *B60N 2/90* | (2018.01) |
| *F16F 1/12* | (2006.01) |
| *F16F 7/116* | (2006.01) |

(52) U.S. Cl.
CPC ............... *F16F 7/104* (2013.01); *B60N 2/90* (2018.02); *F16F 1/06* (2013.01); *F16F 1/123* (2013.01); *F16F 7/116* (2013.01); *F16F 2222/08* (2013.01)

(58) Field of Classification Search
CPC .......... F16F 7/104; F16F 7/116; F16F 222/08; F16F 1/123
See application file for complete search history.

(56) References Cited

U.S. PATENT DOCUMENTS

| | | | | |
|---|---|---|---|---|
| 2,887,071 | A | * 5/1959 | Settles | ............... F16F 7/116 105/392.5 |
| 4,640,500 | A | * 2/1987 | Shiau | ............... F16F 1/024 267/168 |
| 4,925,198 | A | 5/1990 | Ito et al. | |
| 5,647,726 | A | * 7/1997 | Sehgal | ............... B64C 27/001 416/145 |
| 5,775,472 | A | * 7/1998 | Osterberg | ............... F16F 7/10 188/378 |
| 5,816,373 | A | * 10/1998 | Osterberg | ............... F16F 7/1017 188/380 |
| 6,443,273 | B1 | * 9/2002 | Ledbetter | ............... B64C 27/001 188/379 |
| 9,981,587 | B2 | * 5/2018 | Mizobata | ............... B60N 2/80 |

(Continued)

FOREIGN PATENT DOCUMENTS

JP          H01309886 A          12/1989

*Primary Examiner* — Nicholas J Lane
(74) *Attorney, Agent, or Firm* — Holtz, Holtz & Volek PC

(57) ABSTRACT

According to an embodiment, a damping device includes a base member including a first base and a second base, a weight member, a pair of first base-side coil springs provided between the first base and the weight member, and a pair of second base-side coil springs provided between the second base and the weight member. Each of the first base-side coil springs includes a first effective turn portion, a first fixed pin portion supported in the first base, and a first movable pin portion supported in the weight member. Each of the second base-side coil springs includes a second effective turn portion, a second fixed pin portion supported in the second base, and a second movable pin portion supported in the weight member.

12 Claims, 11 Drawing Sheets

(56) References Cited

U.S. PATENT DOCUMENTS

| | | | |
|---|---|---|---|
| 10,252,649 B2* | 4/2019 | Sasaki | B60N 2/503 |
| 10,384,877 B2* | 8/2019 | Quinn | B65G 27/20 |
| 2008/0295545 A1* | 12/2008 | Kim | D06F 37/20 68/23.1 |
| 2010/0320046 A1* | 12/2010 | Provost | F16F 7/015 188/380 |
| 2018/0111525 A1* | 4/2018 | Sasaki | F16F 7/116 |
| 2019/0186576 A1* | 6/2019 | Tamaki | F16F 15/022 |
| 2019/0186578 A1* | 6/2019 | Tamaki | F16F 15/023 |
| 2019/0271370 A1* | 9/2019 | Nishizawa | B60N 2/64 |

\* cited by examiner

|  | First base-side coil spring | | Second base-side coil spring | |
| --- | --- | --- | --- | --- |
|  | No.1 | No.2 | No.1 | No.2 |
| Embodiment 1 | R | R | L | L |
| Embodiment 2 | R | R | R | R |
| Embodiment 3 | L | L | L | L |
| Embodiment 4 | L | R | L | R |
| Embodiment 5 | L | R | R | L |

FIG. 10

DAMPING DEVICE

BACKGROUND OF THE INVENTION

1. Field of the Invention

The present invention relates to a damping device arranged in a vibration suppression target.

2. Description of the Related Art

In a vibration suppression target in which vibration should be suppressed, a damping device may be arranged. The damping device described in each of, for example, U.S. Pat. No. 4,925,198 A (Patent Literature 1) and JP H01-309886 A (Patent Literature 2) includes a base plate, a rod, a pair of coil springs and an inertial mass. The inertial mass is provided between the pair of coil springs, and moves only in a direction along the axis of the rod (axial direction). As another embodiment, each of Patent Literatures 1 and 2 describes a damping device comprising a housing, a pair of coil springs and an inertial mass. The inertial mass is supported on the inner surface of the housing by bearings, and moves only in the axial direction of the housing.

When the inertial mass moves along the rod, friction is produced between the inertial mass and the rod. When the inertial mass moves along the housing, friction is produced between the inertial mass and the housing. Accordingly, in either case, the inertial mass may not be operated in a low acceleration area due to the friction. If a friction reduction member is used to minimize the friction, the cost is increased, and the number of components is also increased. Moreover, since the inertial mass moves in only one direction (axial direction), an effect of suppressing vibration can be exhibited only for the vibration applied in one direction. In order to suppress vibration in multiple directions, multiple damping devices are required.

An example of an improved and undisclosed damping device is effective in the suppression of the vibration of a vibration suppression target which vibrates in the transverse direction of a coil spring (in other words, a direction perpendicular to the axis of a coil spring). The damping device is structured such that the spring constant derived when the coil spring deforms in a first direction is different from the spring constant derived when the coil spring deforms in a second direction. However, if this type of damping device is arranged in a vibration suppression target in which the natural frequency in the first direction is equal to that in the second direction, an effect of suppressing vibration in one of the directions is less.

BRIEF SUMMARY OF THE INVENTION

The object of the present invention is to provide a damping device which can operate even in a low acceleration area and exhibit an effect of suppressing vibration in every direction in the case of a vibration suppression target in which there is no great difference in the natural frequency between the first direction and the second direction.

The damping device of the present invention can be applied to various devices in which vibration should be suppressed. While the damping device is suitable for suppressing vibration of, for example, a vehicle seat, the damping device is not necessarily limited to this application. The orientation of the damping device to be arranged is set in accordance with the specifications of the vibration suppression target, and is not limited to the embodiments described below.

An embodiment of the present invention is a damping device arranged in a vibration suppression target. The damping device comprises a base member comprising a first base and a second base facing each other and fixed to the vibration suppression target, a weight member provided between the first base and the second base, a first spring assembly comprising at least two first base-side coil springs provided in a compressed state between the first base and the weight member, and a second spring assembly comprising at least two second base-side coil springs provided in a compressed state between the second base and the weight member.

Each of the first base-side coil springs comprises a helical first effective turn portion which deforms in a direction along a first axis, a first fixed pin portion which extends from one end of the first effective turn portion in the direction along the first axis and is connected to the first base, and a first movable pin portion which extends from the other end of the first effective turn portion in the direction along the first axis and is connected to the weight member. Each of the second base-side coil springs comprises a helical second effective turn portion which deforms in a direction along a second axis, a second fixed pin portion which extends from one end of the second effective turn portion in the direction along the second axis and is connected to the second base, and a second movable pin portion which extends from the other end of the second effective turn portion in the direction along the second axis and is connected to the weight member.

According to the damping device of the present embodiment, the weight member is capable of moving in the transverse direction of each coil spring (in other words, a direction along a surface perpendicular to an axis) without substantially affected by friction. Thus, the damping device is capable of operating even in a low acceleration area. In addition, even if each coil spring deforms in a first transverse direction or a second transverse direction, the spring constant does not substantially change. Thus, it is possible to perform a function of suppressing the vibration applied in the first transverse direction and the second transverse direction. Since members such as a rod and a housing for guiding the weight member are unnecessary, and a friction reduction member is also unnecessary, the present invention has the advantage that the number of components is reduced.

In the damping device of the present embodiment, the first spring assembly may include a first base-side first coil spring and a first base-side second coil spring, and the second spring assembly may include a second base-side first coil spring provided on the extension of the axis of the first base-side first coil spring, and a second base-side second coil spring provided on the extension of the axis of the first base-side second coil spring. The spring constant of the first base-side first coil spring may be substantially equal to the spring constant of the first base-side second coil spring, and further, the spring constant of the second base-side first coil spring may be substantially equal to the spring constant of the second base-side second coil spring.

The transverse stiffness of each coil spring (the spring constant in the transverse direction) depends on the coil diameter, the free length of the coil spring (the length when no load is applied), and the compression length (predetermined length when the coil spring is compressed). By optimizing these three elements according to the specifications required for the damping device, the spring constant of each coil spring in the transverse direction can be adjusted.

In the embodiment, the winding direction of the first base-side first coil spring may be different from the winding direction of the second base-side first coil spring. The winding direction of the first base-side second coil spring may be different from the winding direction of the second base-side second coil spring. The winding direction of the first base-side first coil spring may be different from the winding direction of the first base-side second coil spring. The winding direction of the second base-side first coil spring may be different from the winding direction of the second base-side second coil spring.

The first fixed pin portion may be inserted into a hole of the first base, and further, the first movable pin portion may be inserted into a hole formed on one surface of the weight member. The second fixed pin portion may be inserted into a hole of the second base, and further, the second movable pin portion may be inserted into a hole formed on the other surface of the weight member. The weight member may comprise a first recess portion which accommodates an end portion of each of the first base-side coil springs, and a second recess portion which accommodates an end portion of each of the second base-side coil springs. Each of the first base-side coil springs and/or each of the second base-side coil springs may comprise a damping member.

An example of the vibration suppression target is a vehicle seat comprising a seat cushion and a seat back. The damping device may be arranged in the seat back such that the first axis of each of the first base-side coil springs and the second axis of each of the second base-side coil springs are along the vertical direction of the seat back.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 10 is a chart in which each clockwise coil spring and each anticlockwise coil spring are indicated as "R" and "L", respectively, regarding each damping device according to the first to fifth embodiments.

DETAILED DESCRIPTION OF THE INVENTION

First Embodiment

This specification explains a damping device according to a first embodiment with reference to FIG. 1 to FIG. 9.

Figure 1:
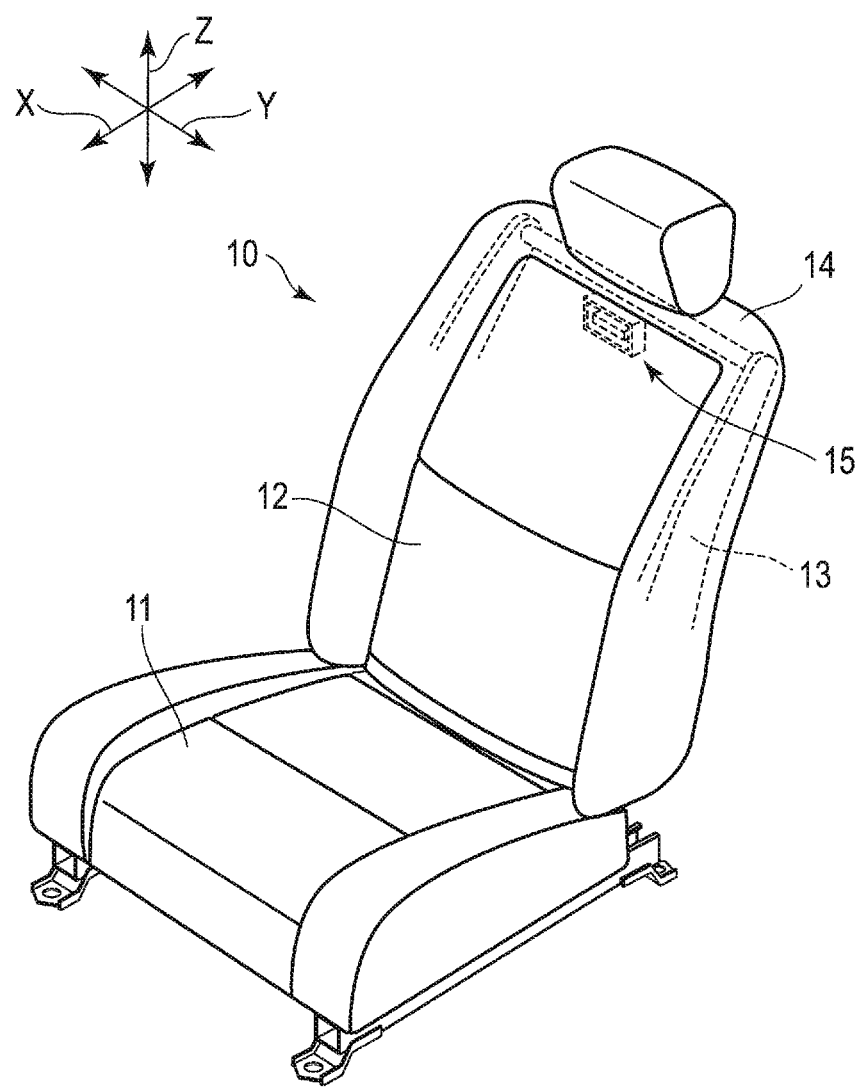
FIG. 1 is a perspective illustration showing an example of a vehicle seat.

FIG. 1 shows a vehicle seat 10. The seat 10 comprises a seat cushion 11 and a seat back 12. The seat back 12 includes a frame 13 and a pad member 14 which covers the frame 13. The seat back 12 is an example of a vibration suppression target. A damping device 15 is arranged in the seat back 12. In FIG. 1, arrow X represents the front-back direction of the seat back 12. Arrow Y represents the width (right-left) direction of the seat back 12. Arrow Z represents the vertical direction of the seat back 12.

Figure 2:
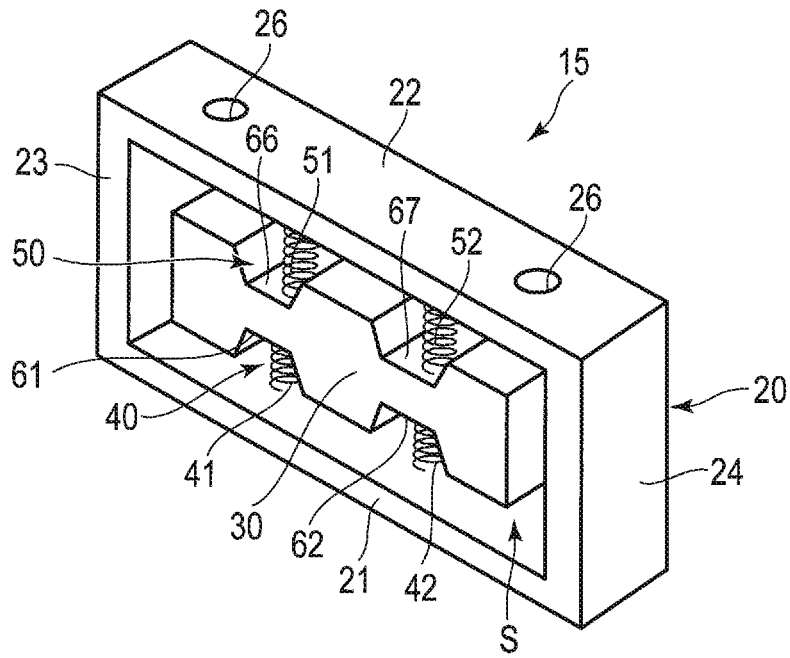
FIG. 2 is a perspective illustration of a damping device according to a first embodiment.
Figure 3:
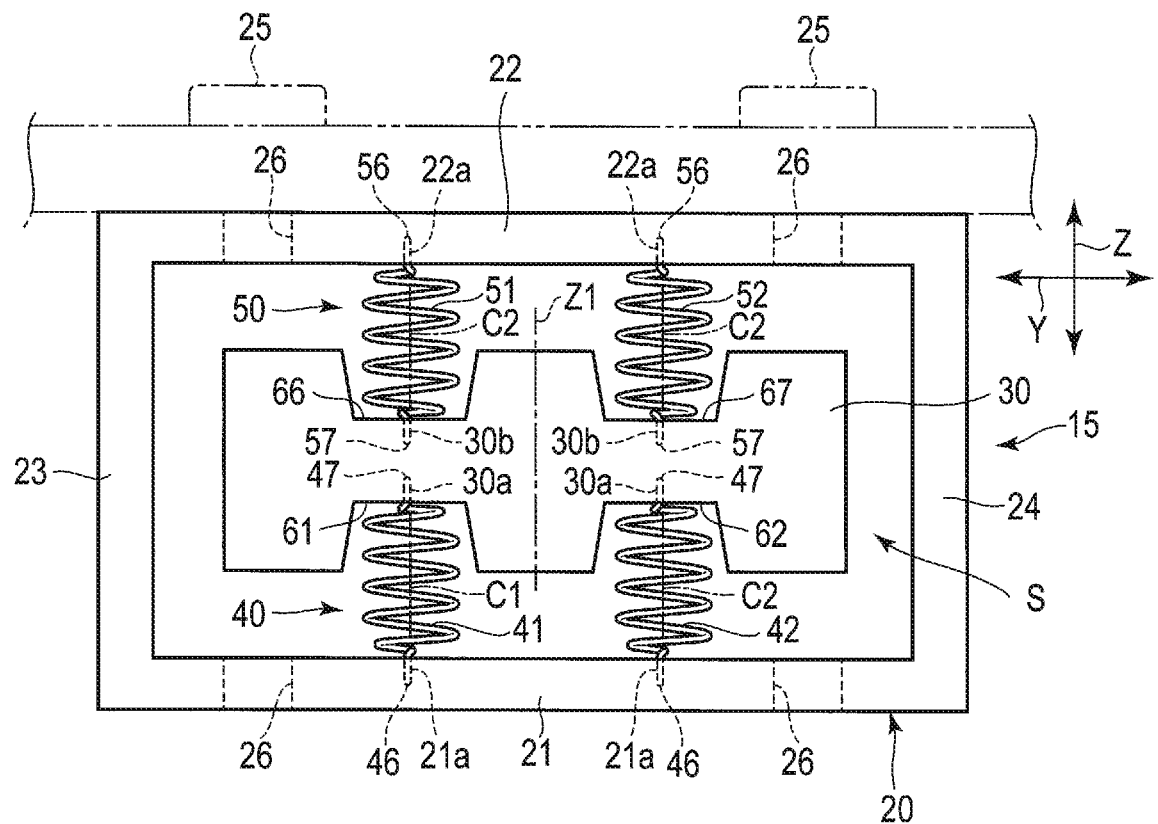
FIG. 3 is a front view of the damping device.
Figure 4:
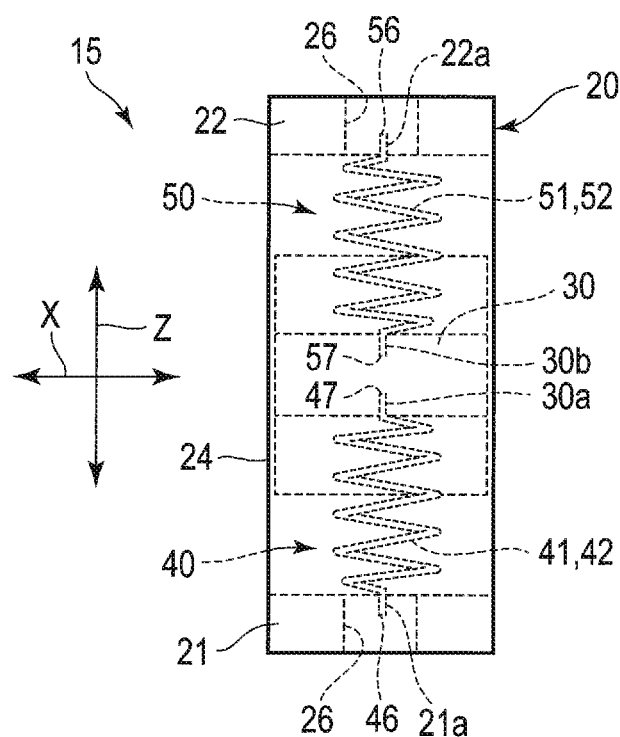
FIG. 4 is a side view of the damping device.
Figure 5:
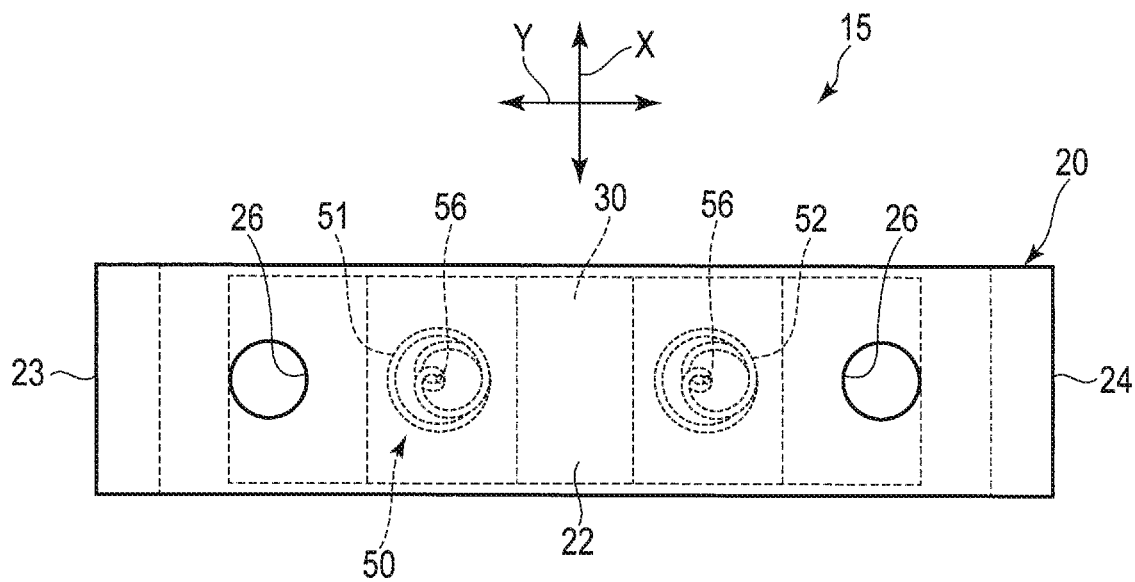
FIG. 5 is a plan view of the damping device.

FIG. 2 is a perspective illustration schematically showing the damping device 15. FIG. 3 is a front view of the damping device 15. FIG. 4 and FIG. 5 are a side view and a plan view schematically showing the damping device 15, respectively. The damping device 15 comprises a base member 20, a weight member 30, a first spring assembly 40 provided under the weight member 30, and a second spring assembly 50 provided above the weight member 30. In FIG. 3 to FIG. 5, arrow X represents the front-back direction of the damping device 15. Arrow Y represents the width (right-left) direction of the damping device 15. Arrow Z represents the vertical direction of the damping device 15.

The base member 20 comprises a first base 21 located on the lower side in the present embodiment, a second base 22 located on the upper side, one longitudinal frame portion 23 and the other longitudinal frame portion 24. The first base 21 and the second base 22 extend in the width direction of the seat back 12. The first base 21 faces the second base 22. The longitudinal frame portions 23 and 24 extend in the vertical direction. A space S which can accommodate the weight member 30 is formed inside the base member 20.

The base member 20 is fixed to the frame 13 of the seat back 12 by fixing bolts 25 (part of the fixing bolts 25 is schematically shown in FIG. 3) such that the first base 21 and the second base 22 are provided along the width direction of the seat back 12. Holes 26 into which the fixing bolts 25 are inserted may be formed in the base member 20. For example, the base member 20 is formed of metal. However, the base member 20 may be formed of resin if the strength is satisfactory.

The weight member 30 is provided between the first base 21 and the second base 22. For example, the weight member 30 is formed of metal. However, a material having a predetermined weight other than metal may be used for the weight member 30. The weight member 30 is elastically supported by the first spring assembly 40 and the second spring assembly 50, and is capable of moving at least in the front-back direction (indicated by arrow X), the width direction (indicated by arrow Y) and the vertical direction (indicated by arrow Z).

The first spring assembly 40 includes a first base-side first coil spring 41 and a first base-side second coil spring 42. In this specification, the first base-side first coil spring 41 and the first base-side second coil spring 42 may be referred to as first base-side coil springs 41 and 42. The first base-side first coil spring 41 and the first base-side second coil spring 42 are juxtaposed to each other in the transverse direction in a compressed state between the first base 21 and the weight member 30. In the present embodiment, the first base-side first coil spring 41 and the first base-side second coil spring 42 are clockwise coil springs.

The spring constant of the first base-side first coil spring 41 is substantially equal to the spring constant of the first base-side second coil spring 42. When the spring constants are substantially equal to each other, the spring constants are within the range of variation caused by a permissible shape error, etc., arising in the manufacturing process of the coil springs. In other words, the spring constants are within the tolerance in practical use. The pair of first base-side coil springs 41 and 42 is provided such that they are juxtaposed between the first base 21 and the weight member 30 and their respective axes C1 are parallel to each other.

Figure 6:
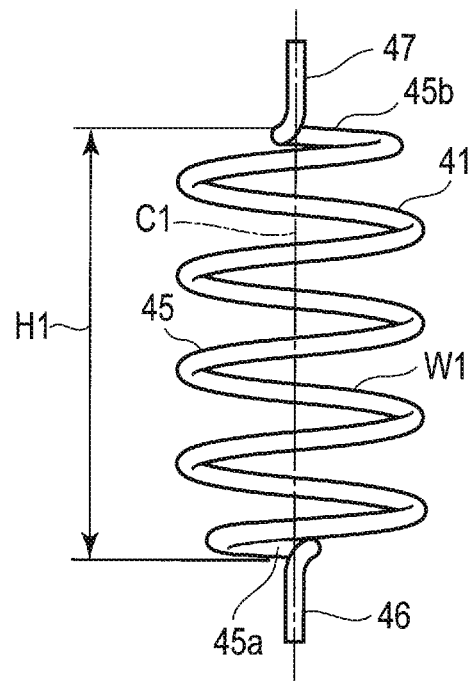
FIG. 6 is a front view of a clockwise coil spring used for the damping device.
Figure 7:
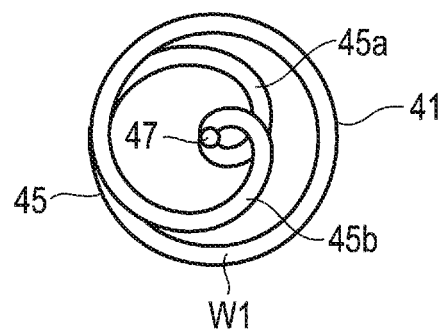
FIG. 7 is a plan view of the coil spring shown in FIG. 6.

FIG. 6 is a front view of the first base-side first coil spring 41 (clockwise coil spring). FIG. 7 is a plan view of the first coil spring 41 shown in FIG. 6. As the first base-side first coil spring 41 and the first base-side second coil spring 42 have a common shape, the first coil spring 41 is explained below as a representative example.

As shown in FIG. 6 and FIG. 7, the first base-side coil spring 41 is a clockwise coil spring shaped like a three-dimensional helix out of a first wire W1 formed of spring steel. The first base-side coil spring 41 comprises a helical first effective turn portion 45 having length H1, a first fixed pin portion 46 and a first movable pin portion 47.

The first effective turn portion 45 is capable of deforming in a direction along the first axis C1. The first axis C1 is located on the central axis of the first effective turn portion 45. As shown in FIG. 6, in a free state in which no load is applied to the first base-side coil spring 41, the portion of length H1 between the fixed pin portion 46 and the movable pin portion 47 is the first effective turn portion 45. The first effective turn portion 45 is a portion which effectively functions as a spring since adjacent winding portions of wire W1 are not in contact with each other even when the first base-side coil spring 41 is compressed to a maximum extent.

As shown in FIG. 6 and FIG. 7, one end portion 45a of the first effective turn portion 45 forms a helical arc and is connected to the first fixed pin portion 46 on the first axis C1. The other end portion 45b of the first effective turn portion 45 also forms a helical arc and is connected to the first movable pin portion 47 on the first axis C1.

The first fixed pin portion 46 extends from one end of the first effective turn portion 45 in a direction along the first axis C1 and is connected to the first base 21. For example, the first fixed pin portion 46 is inserted into a hole 21a formed in the first base 21. Thus, one end side of the first base-side coil spring 41 is substantially supported at a single point in the first base 21.

The first movable pin portion 47 extends from the other end of the first effective turn portion 45 in a direction along the first axis C1 and is connected to the weight member 30. For example, the first movable pin portion 47 is inserted into a hole 30a formed on one surface (for example, the lower surface) of the weight member 30. Thus, the other end side of the first base-side coil spring 41 is substantially supported at a single point in the weight member 30. The first fixed pin portion 46 and the first movable pin portion 47 are located on the first axis C1 passing through the center of the first base-side coil spring 41.

In this way, one end of the first base-side coil spring 41 is substantially supported at a single point in the first base 21, and the other end of the coil spring 41 is substantially supported at a single point in the weight member 30. Thus, even if the first base-side coil spring 41 deforms in the X, Y or Z-direction, the number of turns of the first effective turn portion 45 (in other words, the number of effective turns of the first base-side coil spring 41) does not substantially change.

The second spring assembly 50 includes a second base-side first coil spring 51 and a second base-side second coil spring 52. In this specification, the second base-side first coil spring 51 and the second base-side second coil spring 52 may be referred to as second base-side coil springs 51 and 52. The second base-side first coil spring 51 and the second base-side second coil spring 52 are juxtaposed to each other in the transverse direction in a compressed state between the second base 22 and the weight member 30. In the present embodiment, the second base-side first coil spring 51 and the second base-side second coil spring 52 are anticlockwise coil springs.

The spring constant of the second base-side first coil spring 51 is substantially equal to the spring constant of the second base-side second coil spring 52. The pair of second base-side coil springs 51 and 52 is provided such that they are juxtaposed between the second base 22 and the weight member 30 and their respective axes C2 are parallel to each other. The second base-side first coil spring 51 is provided on the extension of axis C1 of the first base-side first coil spring 41. The second base-side second coil spring 52 is provided on the extension of axis C1 of the first base-side second coil spring 42.

Figure 8:
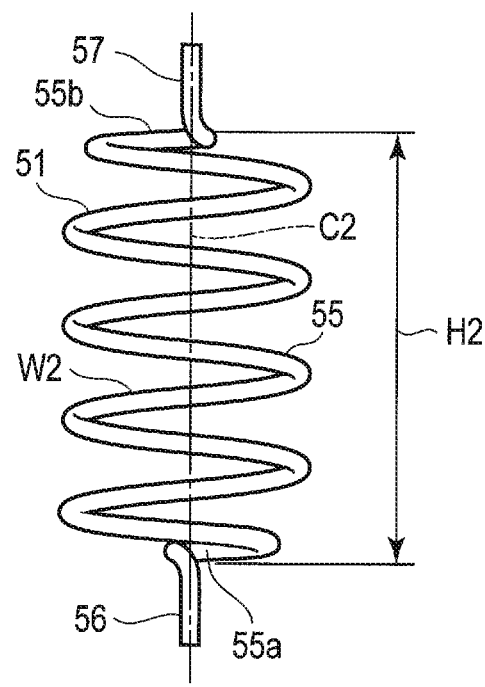
FIG. 8 is a front view of an anticlockwise coil spring used for the damping device.
Figure 9:
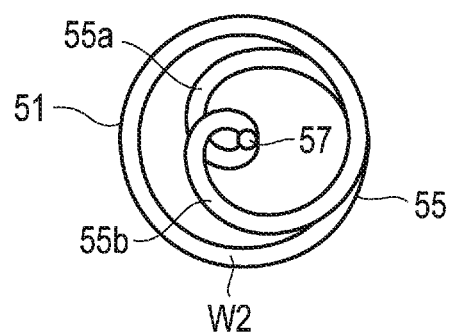
FIG. 9 is a plan view of the coil spring shown in FIG. 8.

FIG. 8 is a front view of the second base-side first coil spring 51 (anticlockwise coil spring). FIG. 9 is a plan view of the first coil spring 51 shown in FIG. 8. As the second base-side first coil spring 51 and the second base-side second coil spring 52 have a common shape, the first coil spring 51 is explained below as a representative example.

As shown in FIG. 8 and FIG. 9, the second base-side coil spring 51 is an anticlockwise coil spring shaped like a three-dimensional helix out of a second wire W2 formed of spring steel. The second base-side coil spring 51 comprises a helical second effective turn portion 55 having length H2, a second fixed pin portion 56 and a second movable pin portion 57.

The second effective turn portion 55 is capable of deforming in a direction along the second axis C2. The second axis C2 is located on the central axis of the second effective turn portion 55. As shown in FIG. 8, in a free state in which no load is applied to the second base-side coil spring 51, the portion of length H2 between the fixed pin portion 56 and the movable pin portion 57 is the second effective turn portion 55. The second effective turn portion 55 is a portion which effectively functions as a spring since adjacent winding portions of wire W2 are not in contact with each other even when the second base-side coil spring 51 is compressed to a maximum extent.

As shown in FIG. 8 and FIG. 9, one end portion 55a of the second effective turn portion 55 forms a helical arc and is connected to the second fixed pin portion 56 on the second axis C2. The other end portion 55b of the second effective turn portion 55 also forms a helical arc and is connected to the second movable pin portion 57 on the second axis C2.

The second fixed pin portion 56 extends from one end of the second effective turn portion 55 in a direction along the second axis C2 and is connected to the second base 22. For example, the second fixed pin portion 56 is inserted into a hole 22a formed in the second base 22. Thus, one end side of the second base-side coil spring 51 is substantially supported at a single point in the second base 22.

The second movable pin portion 57 extends from the other end of the second effective turn portion 55 in a direction along the second axis C2 and is connected to the weight member 30. For example, the second movable pin portion 57 is inserted into a hole 30b formed on the other surface (for example, the upper surface) of the weight member 30. Thus, the other end side of the second base-side coil spring 51 is substantially supported at a single point in the weight member 30. The second fixed pin portion 56 and the second movable pin portion 57 are located on the second axis C2 passing through the center of the second base-side coil spring 51.

In this way, one end of the second base-side coil spring 51 is substantially supported at a single point in the second base 22, and the other end of the coil spring 51 is substantially supported at a single point in the weight member 30. Thus, even if the second base-side coil spring 51 deforms in the X, Y or Z-direction, the number of turns of the second effective turn portion 55 (in other words, the number of effective turns of the second base-side coil spring 51) does not substantially change.

In this specification, a direction along the first axis C1 and the second axis C2 is referred to as a longitudinal direction. In the present embodiment, the longitudinal direction is equivalent to the vertical direction of the seat back 12. A direction along a surface perpendicular to axes C1 and C2 (in other words, the radial direction of each coil spring) is referred to as a transverse direction. The first base-side coil springs 41 and 42 and the second base-side coil springs 51 and 52 are capable of deforming in the longitudinal direction and the transverse direction.

In the damping device 15 of the present embodiment, the first base-side coil springs 41 and 42 are provided under the weight member 30, and the second base-side coil springs 51 and 52 are provided above the weight member 30. Thus, when the damping device 15 is in a stationary state, the weight of the weight member 30 is applied to the first base-side coil springs 41 and 42. For this reason, the spring constants of the first base-side coil springs 41 and 42 may be greater than the spring constants of the second base-side coil springs 51 and 52.

First recess portions 61 and 62 which accommodate end portions of the first base-side coil springs 41 and 42 are formed on one surface (in the present embodiment, the lower surface) of the weight member 30. Second recess portions 66 and 67 which accommodate end portions of the second base-side coil springs 51 and 52 are formed on the other surface (in the present embodiment, the upper surface) of the weight member 30. In this way, part of the first base-side coil springs 41 and 42 in the length direction are accommodated in the first recess portions 61 and 62, and part of the second base-side coil springs 51 and 52 in the length direction is accommodated in the second recess portions 66 and 67. Thus, the height of the base member 20 can be decreased, thereby reducing the size of the damping device 15.

FIG. 10 is a chart in which each clockwise coil spring and each anticlockwise coil spring are indicated as "R" and "L", respectively, regarding the coil springs used for each damping device according to the present (first) embodiment to a fifth embodiment. Each damping device of the second to fifth embodiments is explained later.

As shown in Embodiment 1 of FIG. 10, in the damping device 15 of the present (first) embodiment, the first base-side first coil spring 41 and the first base-side second coil spring 42 are clockwise coil springs (R), and the second base-side first coil spring 51 and the second base-side second coil spring 52 are anticlockwise coil springs (L). Thus, the winding direction of the first base-side first coil spring 41 is opposite to the winding direction of the second base-side first coil spring 51. Moreover, the winding direction of the first base-side second coil spring 42 is opposite to the winding direction of the second base-side second coil spring 52.

In the seat back 12 of the present embodiment, the natural frequency in the front-back direction (the first transverse direction indicated by arrow X in FIG. 1) is substantially equal to the natural frequency in the width direction (the second transverse direction indicated by arrow Y in FIG. 1). The damping device 15 arranged in this type of seat back 12 is required to conform the vibration characteristic in the front-back direction to the vibration characteristic in the width direction such that the vibration of the seat back 12 in the front-back direction and the width direction can be suppressed.

One end of each of the first base-side coil springs 41 and 42 is substantially supported at a single point in the first base 21. The other end of each of the first base-side coil springs 41 and 42 is substantially supported at a single point in the weight member 30. Thus, there is no difference in the number of turns of the effective turn portion 45 between when the first base-side coil springs 41 and 42 move in the front-back direction (the first transverse direction) and when they move in the width direction (the second transverse direction). In other words, the spring constants of the coil springs 41 and 42 when the weight member 30 moves in the front-back direction are substantially equal to those when the weight member 30 moves in the width direction. The spring constants of the coil springs 41 and 42 in the transverse direction are set depending on the natural frequency of the weight member 30 by optimizing the coil diameters of the coil springs 41 and 42, the free length (the length when no load is applied), the length when the coil springs 41 and 42 are compressed to predetermined length, etc.

One end of each of the second base-side coil springs 51 and 52 is substantially supported at a single point in the second base 22. The other end of each of the second base-side coil springs 51 and 52 is substantially supported at a single point in the weight member 30. Thus, there is no difference in the number of turns of the effective turn portion 55 between when the second base-side coil springs 51 and 52 move in the front-back direction (the first transverse direction) and when they move in the width direction (the second transverse direction). In other words, the spring constants of the coil springs 51 and 52 when the weight member 30 moves in the front-back direction are equal to those when the weight member 30 moves in the width direction. The spring constants of the coil springs 51 and 52 in the transverse direction are set depending on the natural frequency of the weight member 30 by optimizing the coil diameters of the coil springs 51 and 52, the free length (the length when no load is applied), the length when the coil springs 51 and 52 are compressed to predetermined length, etc.

In the damping device 15 of the present embodiment, the natural frequency of the weight member 30 when the weight member 30 vibrates in the front-back direction (the first transverse direction indicated by arrow X in FIG. 1) can be made equal to that when the weight member 30 vibrates in the width direction (the second transverse direction indicated by arrow Y in FIG. 1). In this way, the damping device 15 of the present embodiment is capable of performing a function of suppressing the vibration caused in the front-back direction and width direction of the seat back 12.

It is known that, when a coil spring deforms in a transverse direction or longitudinal direction, a moment about an axis occurs depending on the winding direction of the coil spring. For example, when the first base-side coil springs 41 and 42 deform, a moment about axis C1 occurs in each of the coil springs 41 and 42. When the second base-side coil springs 51 and 52 deform, a moment about axis C2 occurs in each of the coil springs 51 and 52.

In the damping device 15 of the present embodiment, the winding direction of the first base-side first coil spring 41 is opposite to the winding direction of the second base-side first coil spring 51. Thus, the moment about axis C1 in the first base-side first coil spring 41 is offset by the moment about axis C2 in the second base-side first coil spring 51. Moreover, the winding direction of the first base-side second coil spring 42 is opposite to the winding direction of the second base-side second coil spring 52. Thus, the moment about axis C1 in the first base-side second coil spring 42 is offset by the moment about axis C2 in the second base-side second coil spring 52. In this way, the moment for rotating the weight member 30 is eliminated, thereby preventing the decrease in the effect of suppressing vibration.

As the weight member 30 of the present embodiment is supported by only the coil springs 41, 42, 51 and 52, there is a possibility that the weight member 30 rotates around a vertical axis Z1 (shown in FIG. 3). However, the weight member 30 is supported in the base member 20 by two coil springs 41 and 42 juxtaposed to each other and two coil springs 51 and 52 juxtaposed to each other. This structure can prevent the weight member 30 from rotating around the vertical axis Z1.

Figure 11:
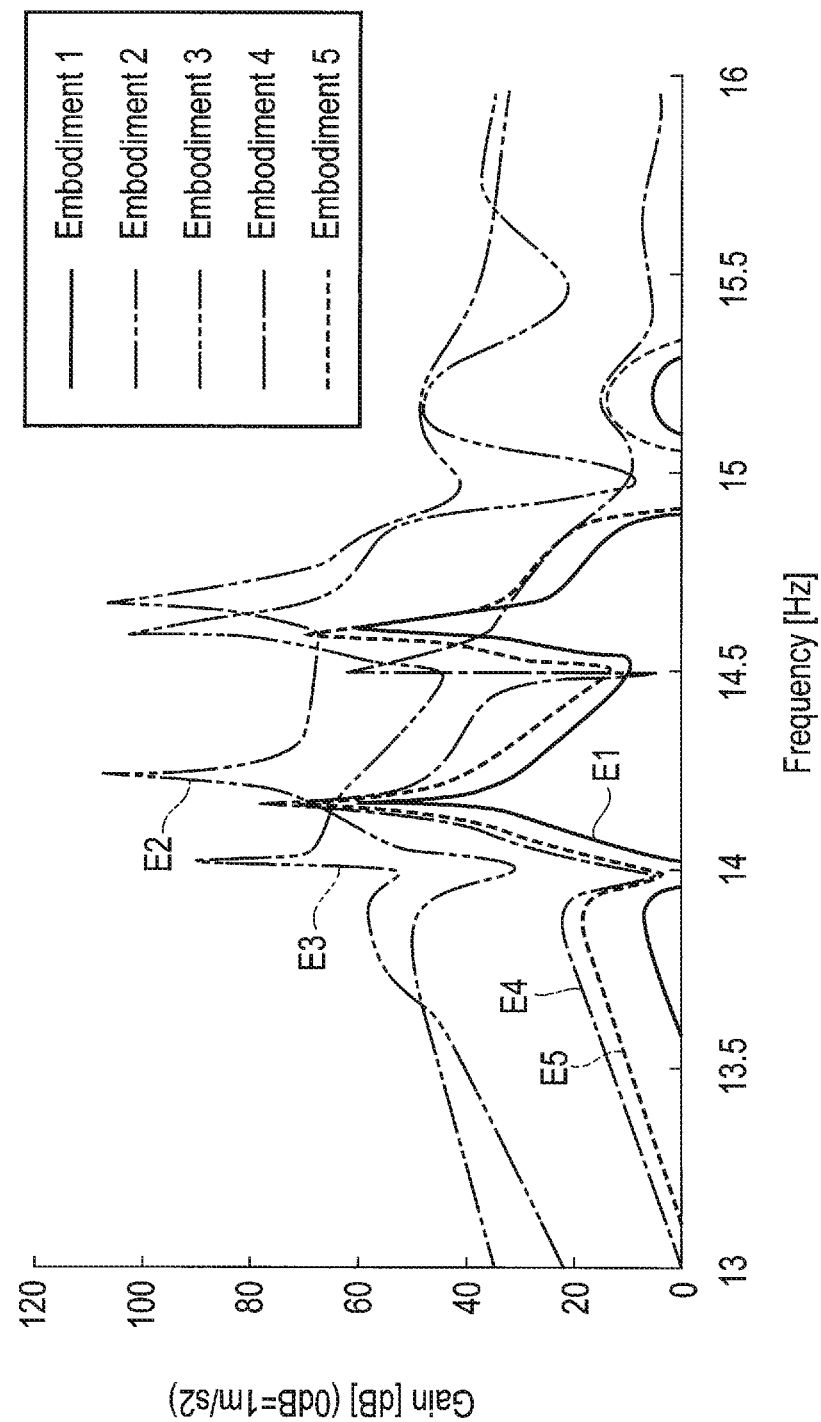
FIG. 11 is a graph showing the vibration damping characteristic (the relationship between a frequency and a gain) of each damping device according to the first to fifth embodiment.

FIG. 11 is a graph showing the vibration damping characteristic (the relationship between a frequency and a gain) of each damping device according to the first to fifth embodiment. In FIG. 11, the solid line E1 represents the vibration damping characteristic of the damping device 15 of the first embodiment. The damping device 15 of the present embodiment exhibits an excellent effect of suppressing vibration.

Second Embodiment

In the damping device of the second embodiment, as shown in Embodiment 2 of FIG. 10, a first base-side first coil spring 41 and a first base-side second coil spring 42 are clockwise coil springs (R). A second base-side first coil spring 51 and a second base-side second coil spring 52 are also clockwise coil springs (R). The other structures are common to the damping device of the second embodiment and the damping device 15 of the first embodiment. In the second embodiment, all the coil springs 41, 42, 51 and 52 have the same winding direction (clockwise). Thus, when the coil springs 41, 42, 51 and 52 deform, a moment occurring about each axis acts on a weight member 30. In FIG. 11, the two-dot chain line E2 represents the vibration damping characteristic of the second embodiment and shows that an effect of suppressing vibration is less.

Third Embodiment

In the damping device of the third embodiment, as shown in Embodiment 3 of FIG. 10, a first base-side first coil spring 41 and a first base-side second coil spring 42 are anticlockwise coil springs (L). A second base-side first coil spring 51 and a second base-side second coil spring 52 are also anticlockwise coil springs (L). The other structures are common to the damping device of the third embodiment and the damping device 15 of the first embodiment. In the third embodiment, all the coil springs 41, 42, 51 and 52 have the same winding direction (anticlockwise). Thus, when the coil springs 41, 42, 51 and 52 deform, a moment occurring about each axis acts on a weight member 30. In FIG. 11, the three-dot chain line E3 represents the vibration damping characteristic of the third embodiment and shows that an effect of suppressing vibration is less.

Fourth Embodiment

In the damping device of the fourth embodiment, as shown in Embodiment 4 of FIG. 10, a first base-side first coil spring 41 and a second base-side first coil spring 51 are anticlockwise coil springs (L). A first base-side second coil spring 42 and a second base-side second coil spring 52 are clockwise coil springs (R). In the damping device of the fourth embodiment, the winding direction of the first base-side first coil spring 41 is opposite to the winding direction of the first base-side second coil spring 42. The winding direction of the second base-side first coil spring 51 is also opposite to the winding direction of the second base-side second coil spring 52. The other structures are common to the damping device of the fourth embodiment and the damping device 15 of the first embodiment. In FIG. 11, the one-dot chain line E4 represents the vibration damping characteristic of the fourth embodiment and shows that an effect of suppressing vibration is exerted.

Fifth Embodiment

In the damping device of the fifth embodiment, as shown in Embodiment 5 of FIG. 10, a first base-side first coil spring 41 and a second base-side second coil spring 52 are anticlockwise coil springs (L). A first base-side second coil spring 42 and a second base-side first coil spring 51 are clockwise coil springs (R). The winding direction of the first base-side first coil spring 41 is opposite to the winding direction of the first base-side second coil spring 42. The winding direction of the second base-side first coil spring 51 is also opposite to the winding direction of the second base-side second coil spring 52. The other structures are common to the damping device of the present embodiment and the damping device 15 of the first embodiment. In FIG. 11, the broken line E5 represents the vibration damping characteristic of the damping device of the fifth embodiment and shows that an effect of suppressing vibration is exerted.

Sixth Embodiment

Figure 12:
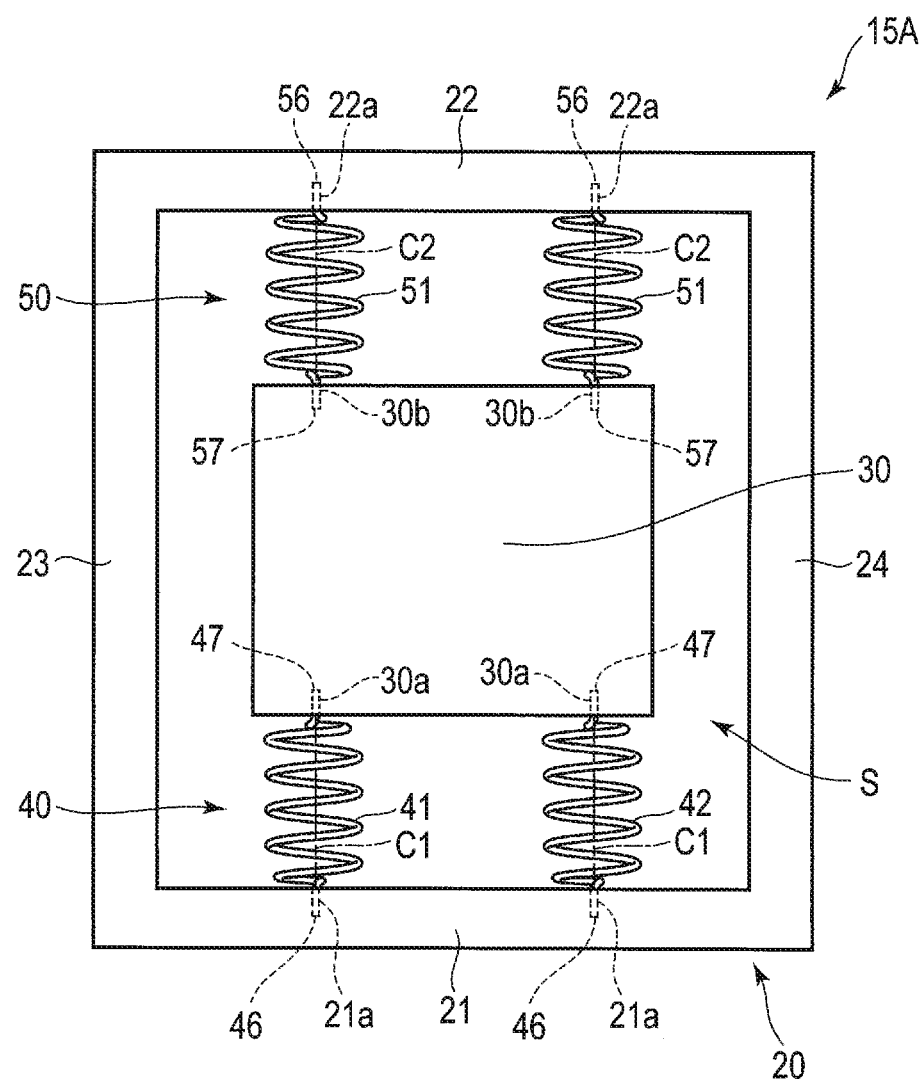
FIG. 12 is a front view of a damping device according to a sixth embodiment.

FIG. 12 shows a damping device 15A according to a sixth embodiment. None of the recess portions 61, 62, 66 and 67 of the weight member 30 of the first embodiment (FIG. 2 to FIG. 5) is formed in the weight member 30 of the damping device 15A. The other structures and effects are common to the damping device 15A of the sixth embodiment and the damping device 15 of the first embodiment. Thus, common reference numbers are assigned to common portions, an explanation thereof being omitted.

Seventh Embodiment

Figure 13:
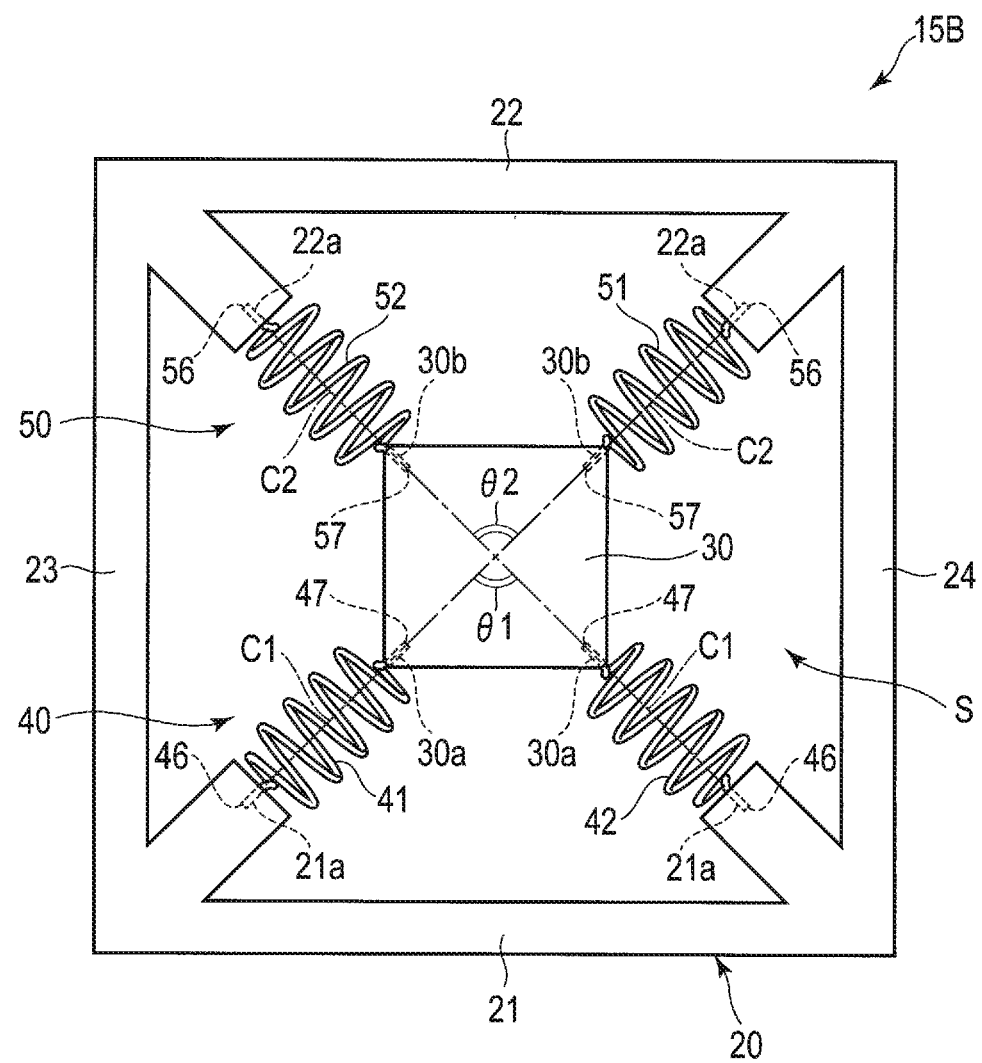
FIG. 13 is a front view of a damping device according to a seventh embodiment.

FIG. 13 shows a damping device 15B according to a seventh embodiment. The damping device 15B comprises a first spring assembly 40 including a first base-side first coil spring 41 and a first base-side second coil spring 42, and a second spring assembly 50 including a second base-side first coil spring 51 and a second base-side second coil spring 52. The first base-side first coil spring 41 and the first base-side second coil spring 42 make a first angle θ1 with each other, and are provided in a V-shape (a reverse V-shape in the figure) between a base member 20 and a weight member 30. The second base-side first coil spring 51 and the second base-side second coil spring 52 make a second angle θ2 with each other, and are provided in a V-shape between the base member 20 and the weight member 30.

As shown in FIG. 13, the second base-side first coil spring 51 is provided on the extension of axis C1 of the first base-side first coil spring 41. The second base-side second coil spring 52 is provided on the extension of axis C1 of the first base-side second coil spring 42. The other structures and effects are common to the damping device 15B of the present embodiment and the damping device 15 of the first embodiment. Thus, common reference numbers are assigned to common portions, an explanation thereof being omitted.

Eighth Embodiment

Figure 14:
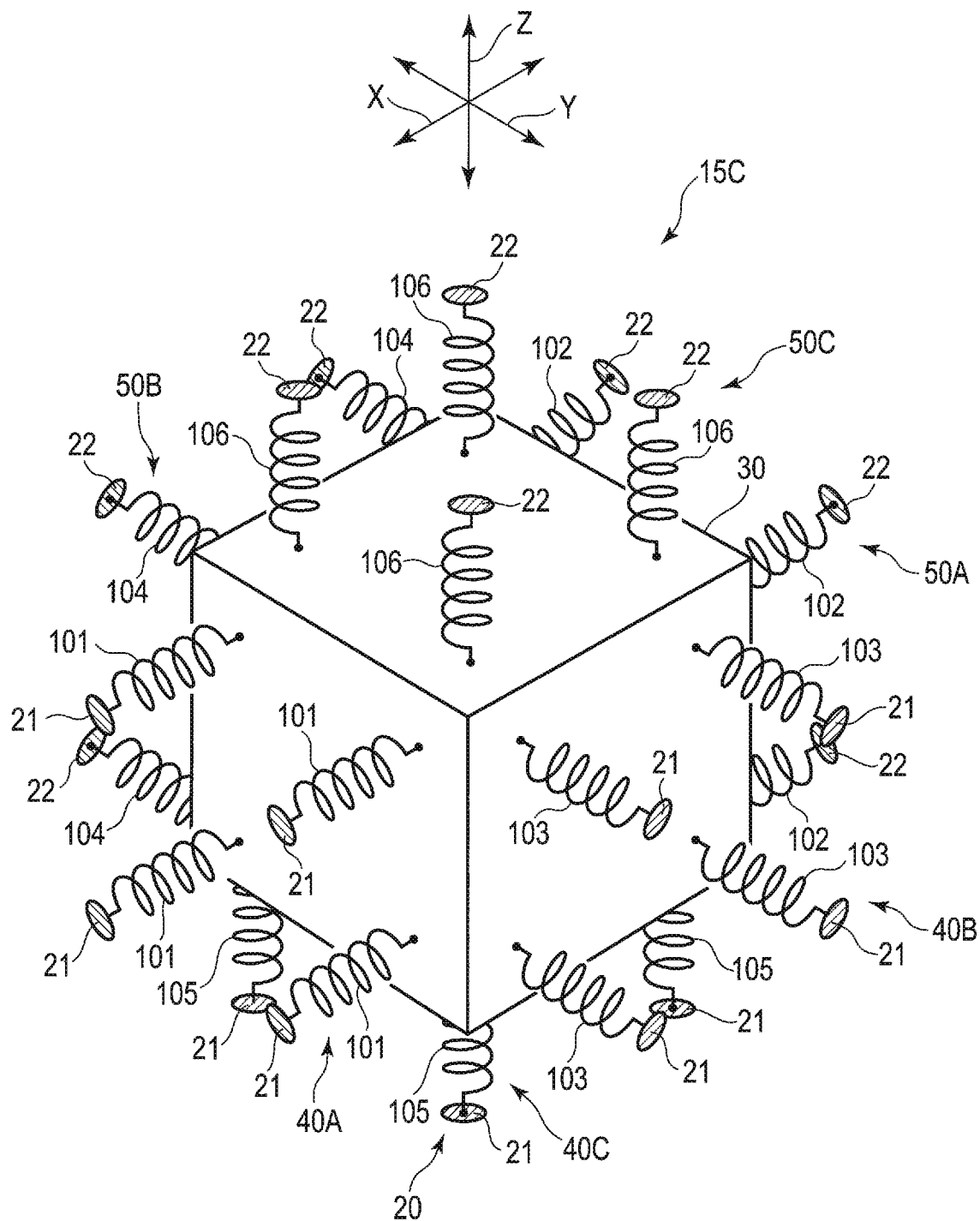
FIG. 14 is a perspective illustration of a damping device according to an eighth embodiment.

FIG. 14 shows a damping device 15C according to an eighth embodiment. The damping device 15C is a multiaxial dynamic damper configured to damp a vibration suppression target in which the frequencies of vibration in three axes (an X-axis, a Y-axis and a Z-axis) are equal to each other. The damping device 15C comprises a first spring assembly 40A and a second spring assembly 50A provided in an X-axial direction, a first spring assembly 40B and a second spring assembly 50B provided in a Y-axial direction, and a first spring assembly 40C and a second spring assembly 50C provided in a Z-axial direction. FIG. 14 shows only part of a first base 21 and part of a second base 22 to simplify the figure.

The first spring assembly 40A in the X-axial direction includes a plurality of pairs of first base-side coil springs 101 provided between the first base 21 and a weight member 30. The second spring assembly 50A in the X-axial direction includes a plurality of pairs of second base-side coil springs 102 provided between the second base 22 and the weight member 30. The first spring assembly 40B in the Y-axial direction includes a plurality of pairs of first base-side coil springs 103 provided between the first base 21 and the weight member 30. The second spring assembly 50B in the Y-axial direction includes a plurality of pairs of second base-side coil springs 104 provided between the second base 22 and the weight member 30. The first spring assembly 40C in the Z-axial direction includes a plurality of pairs of first base-side coil springs 105 provided between the first base 21 and the weight member 30. The second spring assembly 50C in the Z-axial direction includes a plurality of pairs of second base-side coil springs 106 provided between the second base 22 and the weight member 30. The first base-side coil springs 101, 103 and 105 may be the same as the first base-side coil springs 41 and 42 explained in the above embodiments. The second base-side coil springs 102, 104 and 106 may be the same as the second base-side coil springs 51 and 52 explained in the above embodiments.

Ninth Embodiment

Figure 15:
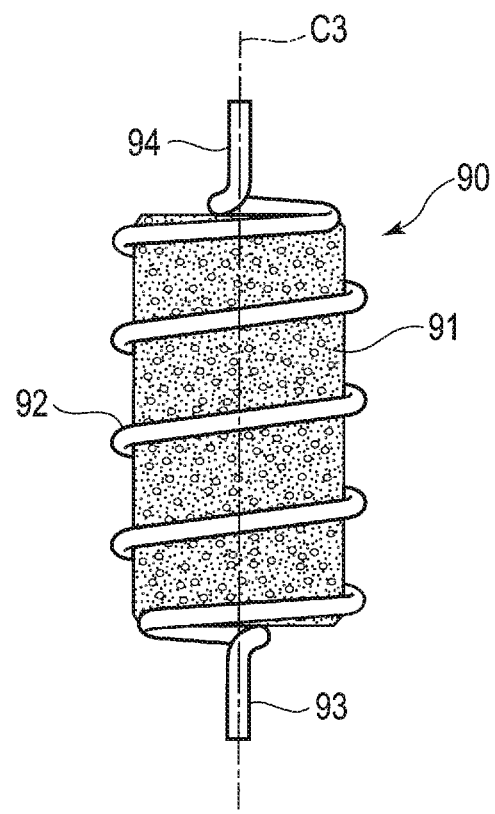
FIG. 15 is a front view of a coil spring with a damping member according to a ninth embodiment.
Figure 16:
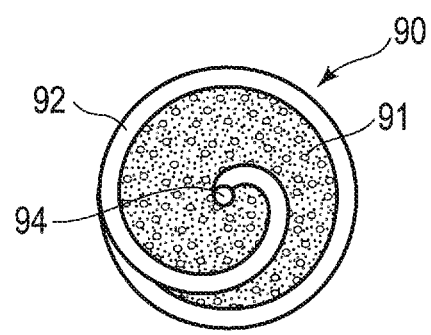
FIG. 16 is a plan view of the coil spring with the damping member shown in FIG. 15.

FIG. 15 is a front view of a coil spring 90 with a damping member according to a ninth embodiment. FIG. 16 is a plan view of the coil spring 90 with the damping member. A damping member 91 is provided in the coil spring 90. The damping member 91 is formed of a material which has a low resilience and an effect of suppressing vibration (for example, formed plastics which have a low resilience and an effect of suppressing vibration). The coil spring 90 with the damping member comprises a helical effective turn portion 92, a fixed pin portion 93 and a movable pin portion 94. Axis C3 of the coil spring 90 passes through the center of the effective turn portion 92. The winding direction of the effective turn portion 92 is clockwise or anticlockwise depending on the need. The effective turn portion 92 deforms in a direction along axis C3. The fixed pin portion 93 extends from one end of the effective turn portion 92 in a direction along axis C3. The movable pin portion 94 extends from the other end of the effective turn portion 92 in a direction along axis C3. The fixed pin portion 93 and the movable pin portion 94 are located on axis C3. The coil spring 90 with the damping member may be used for each first base-side coil spring and/or each second base-side coil spring of each damping device of the above embodiments. The damping member may be provided inside the coil spring, or may be provided so as to cover the outside of the coil spring. Alternatively, a gel damping member may be used.

The damping device of the present invention is not limited to those of the above embodiments. A damping device in a broader aspect can be arranged in a vibration suppression target other than a vehicle seat. The orientation of the damping device to be arranged is determined in accordance with the direction in which the vibration to be suppressed is input. When the resonance frequency of a vibration suppression target in the first transverse direction is equal to that in the second transverse direction, a damping device is arranged in the vibration suppression target such that the first base-side coil springs and the second base-side coil springs deform in the first transverse direction and the second transverse direction.

As a matter of course, the forms of the base member, weight member, first base-side coil springs, second base-side coil springs, etc., of the damping device, such as the material, shape, size and position, can be modified within the scope of the invention when the invention is implemented. The damping device of the present invention may be arranged in a vibration suppression target other than a vehicle seat.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A damping device for a vibration suppression target, the damping device comprising:

a base member comprising a first base and a second base facing each other, the base member being fixable to the vibration suppression target;

a weight member provided between the first base and the second base;

a first spring assembly comprising at least two first base-side coil springs provided in a compressed state between the first base and the weight member, each of the first base-side coil springs being formed of a first wire and comprising:
  a helical first effective turn portion which is part of the first wire and deforms in a direction along a first axis;
  a first fixed pin portion which is part of the first wire, extends from a first end of the first effective turn portion in the direction along the first axis and is connected to the first base; and
  a first movable pin portion which is part of the first wire, extends from a second end of the first effective turn portion in the direction along the first axis and is connected to the weight member; and a second spring assembly comprising at least two second base-side coil springs provided in a compressed state between the second base and the weight member, each of the second base-side coil springs being formed of a second wire and comprising:
  a helical second effective turn portion which is part of the second wire and deforms in a direction along a second axis;
  a second fixed pin portion which is part of the second wire, extends from a first end of the second effective turn portion in the direction along the second axis and is connected to the second base; and
  a second movable pin portion which is part of the second wire, extends from a second end of the second effective turn portion in the direction along the second axis and is connected to the weight member, wherein:
the first fixed pin portion is inserted into a hole of the first base, and the first movable pin portion is inserted into a hole formed on a first surface of the weight member, and
the second fixed pin portion is inserted into a hole of the second base, and the second movable pin portion is inserted into a hole formed on a second surface of the weight member.

2. The damping device of claim 1, wherein:
the first spring assembly includes a first base-side first coil spring and a first base-side second coil spring, and
the second spring assembly includes a second base-side first coil spring provided on an extension of an axis of the first base-side first coil spring, and a second base-side second coil spring provided on an extension of an axis of the first base-side second coil spring.

3. The damping device of claim 2, wherein:
a spring constant of the first base-side first coil spring is substantially equal to a spring constant of the first base-side second coil spring, and
a spring constant of the second base-side first coil spring is substantially equal to a spring constant of the second base-side second coil spring.

4. The damping device of claim 2, wherein:
a winding direction of the first base-side first coil spring is different from a winding direction of the second base-side first coil spring.

5. The damping device of claim 2, wherein:
a winding direction of the first base-side second coil spring is different from a winding direction of the second base-side second coil spring.

6. The damping device of claim 2, wherein:
a winding direction of the first base-side first coil spring is different from a winding direction of the first base-side second coil spring.

7. The damping device of claim 2, wherein:
a winding direction of the second base-side first coil spring is different from a winding direction of the second base-side second coil spring.

8. The damping device of claim 1, wherein:
the weight member comprises a first recess portion which accommodates the second end portion of each of the first effective turn portions, and a second recess portion which accommodates the second end portion of each of the second effective turn portions.

9. The damping device of claim 2, wherein:
the first base-side first coil spring and the first base-side second coil spring make a first angle with each other, and are provided in a V-shape between the base member and the weight member, and
the second base-side first coil spring and the second base-side second coil spring make a second angle with each other, and are provided in a V-shape between the base member and the weight member.

10. The damping device of claim 1, wherein:
each of the first base-side coil springs comprises a damping member.

11. The damping device of claim 1, wherein:
each of the second base-side coil springs comprises a damping member.

12. The damping device of claim 1, wherein:
the vibration suppression target is a vehicle seat comprising a seat cushion and a seat back, and
the damping device is arranged in the seat back such that the first axis of each of the first base-side coil springs and the second axis of each of the second base-side coil springs are along a vertical direction of the seat back.

* * * * *